(12) United States Patent
Lonikar

(10) Patent No.: US 9,411,435 B2
(45) Date of Patent: Aug. 9, 2016

(54) SYSTEMS AND METHODS RELATING TO DESIGN OF MOBILE APPLICATIONS FOR DISPLAY ADS ON A LARGER SCREEN SPACE

(71) Applicant: Yahoo! Inc., Sunnyvale, CA (US)

(72) Inventor: Kiran B. Lonikar, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 303 days.

(21) Appl. No.: 13/735,680

(22) Filed: Jan. 7, 2013

(65) Prior Publication Data

US 2014/0192088 A1    Jul. 10, 2014

(51) Int. Cl.
*G06F 3/0346* (2013.01)

(52) U.S. Cl.
CPC ...... *G06F 3/0346* (2013.01); *G09G 2320/0261* (2013.01); *G09G 2340/0492* (2013.01)

(58) Field of Classification Search
CPC ............ G06F 3/0346; G06F 17/30058; G06F 2200/1637; G06F 3/017; G06F 3/04845; G09G 2340/0492
USPC ........................................................ 345/653
See application file for complete search history.

(56) References Cited

U.S. PATENT DOCUMENTS

| 2005/0108095 | A1* | 5/2005 | Perlmutter ...................... 705/14 |
| 2010/0050129 | A1* | 2/2010 | Li et al. .......................... 715/849 |
| 2010/0162603 | A1* | 7/2010 | Cruz ................................ 40/720 |
| 2011/0187709 | A1* | 8/2011 | Lee et al. ....................... 345/419 |
| 2013/0169687 | A1* | 7/2013 | Williamson et al. ........... 345/656 |

FOREIGN PATENT DOCUMENTS

WO   WO 2012125131 A1 *  9/2012   ................ A63F 9/24

* cited by examiner

*Primary Examiner* — Kee M Tung
*Assistant Examiner* — Nicholas R Wilson
(74) *Attorney, Agent, or Firm* — Mauriel Kapouytian Woods LLP; Lawrence R. Gabuzda

(57) ABSTRACT

Techniques are provided which facilitate mobile applications displaying advertisements on a larger screen space without worrying about screen clutter or interference with application functionality. Motion events are triggered once a computerized device detects a threshold magnitude of tilt along a first, second, and/or third coordinate axis. A graphical display is presented to the user which includes at least one advertisement. Several embodiments of the graphical display include a three-dimensional object and full-screen display which are maintained so long as a magnitude of tilt of the computerized device is detected.

14 Claims, 5 Drawing Sheets

SYSTEMS AND METHODS RELATING TO DESIGN OF MOBILE APPLICATIONS FOR DISPLAY ADS ON A LARGER SCREEN SPACE

BACKGROUND

With the advent of smart phones equipped with faster data speeds, mobile applications have significantly displaced traditional laptops and desktops as the primary internet browsing access point for many consumers. According to the Pew Internet Project, nearly half (46%) of American adults are smartphone owners. A majority of adult cell owners (55%) now go online using their phones, and 17% of cell phone owners do most of their online browsing on their phone, rather than a computer or other device.

However, advertising through mobile applications has largely been limited due to a variety of reasons. The important mobile application markets like Android and Apple iTunes for iOS devices have strict policies on display advertising. They do not allow applications which use large screen space for advertising, since they cause screen clutter and interference in application functionality. Display advertising on mobile devices is generally shown on small strips either at the bottom or top of the application, or notification areas of the mobile device screen. This technique has a limited effect on the end user due to a small screen size and thus has limited the revenue generation through these ads. There have been many attempts to work around this limitation, but none of the designs have overcome this constraint.

Accordingly, there is a need for mobile applications which can display advertisements on a larger screen space without worrying about screen clutter or interference with application functionality.

SUMMARY

Some embodiments of the present invention provide systems and methods which take advantage of the particular motion events associated with a mobile device. These events act as additional user inputs for which the user does not make any significant effort. These events, when delivered to the application, have the data of device orientation, like angles of rotation around the three co-ordinate axis. The application can use these angle inputs to trigger display advertisements on the entire device screen when the angles are beyond some threshold, and return to normal display on other angles.

In some embodiments, the "home" or the first screen of the application may be designed in a special three dimensional appearance (e.g. a rotating cube), which can be rotated through touch screen interaction or device motion events described below. The different faces of the rotating cube can display different features of the application or preview of different screens of the application, with one face reserved for displaying advertisements. By rotating the cube, and selecting a face of the cube, the user can navigate to any screen of the application, including the advertisement screen. The user can come back to home screen through the use of a special "Home" button on the application, visible on all screens of the application.

DETAILED DESCRIPTION

Figure 1:
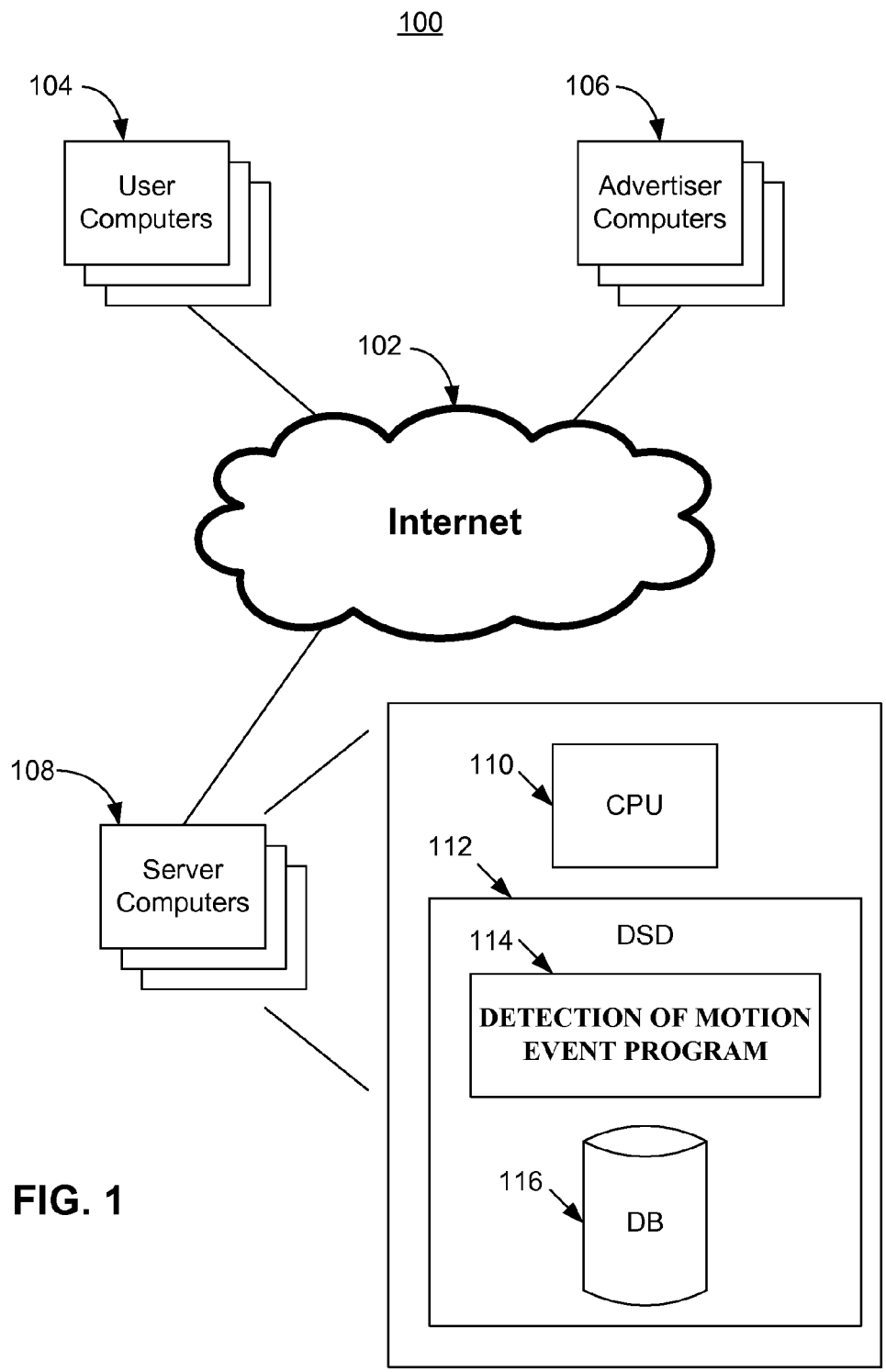
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers 104 may be or include desktop or laptop PCs, as well as, wireless, mobile, or handheld devices such as smart phones, PDAs, tablets, etc.

Each of the one or more computers 104, 106 and 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Detection of Motion Event Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
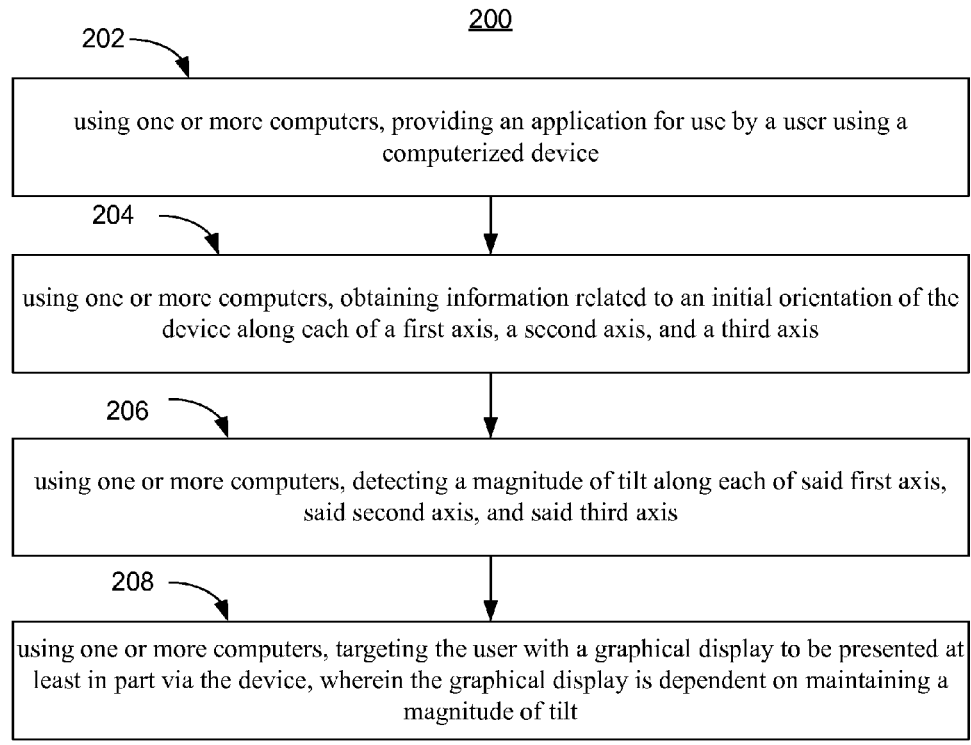
FIG. 2 is a flow diagram illustrating a method according to one embodiment of the invention.

FIG. 2 is a flow diagram illustrating a method 200 according to one embodiment of the invention. At step 202, using one or more server computers, an application for use by a user using a computerized device is provided. In some embodiments, a computerized device includes but is not limited to a mobile device, cell phone, tablet, PDA, or e-book reader. An application is typically installed by a user onto said computerized device on several platforms such as Apple iOS or Android operating systems.

At step 204, using one or more computers, information related to an initial orientation of the device along each of a first axis, a second axis, and a third axis is obtained. This information serves as a measurement against any subsequent movements to detect any potential motion event triggered by a change in magnitude of tilt along any of the axes. To illustrate by way of example, a user who has a smartphone and opens a mobile application on his/her smartphone while holding it in his/her hand at a certain initial orientation. Any subsequent movements of the smartphone by the user may trigger a motion event depending on the magnitude of tilt along the coordinate axes with respect to the initial orientation.

At step 206, using one or more computers, it is determined whether there exists a magnitude of tilt along each of said first axis, said second axis, and said third axis. This determination is made with respect to the initial orientation. At step 208, using one or more computers, the user is targeted with a graphical display to be presented at least in part via the device, wherein the graphical display is dependent on maintaining a magnitude of tilt.

Figure 3:
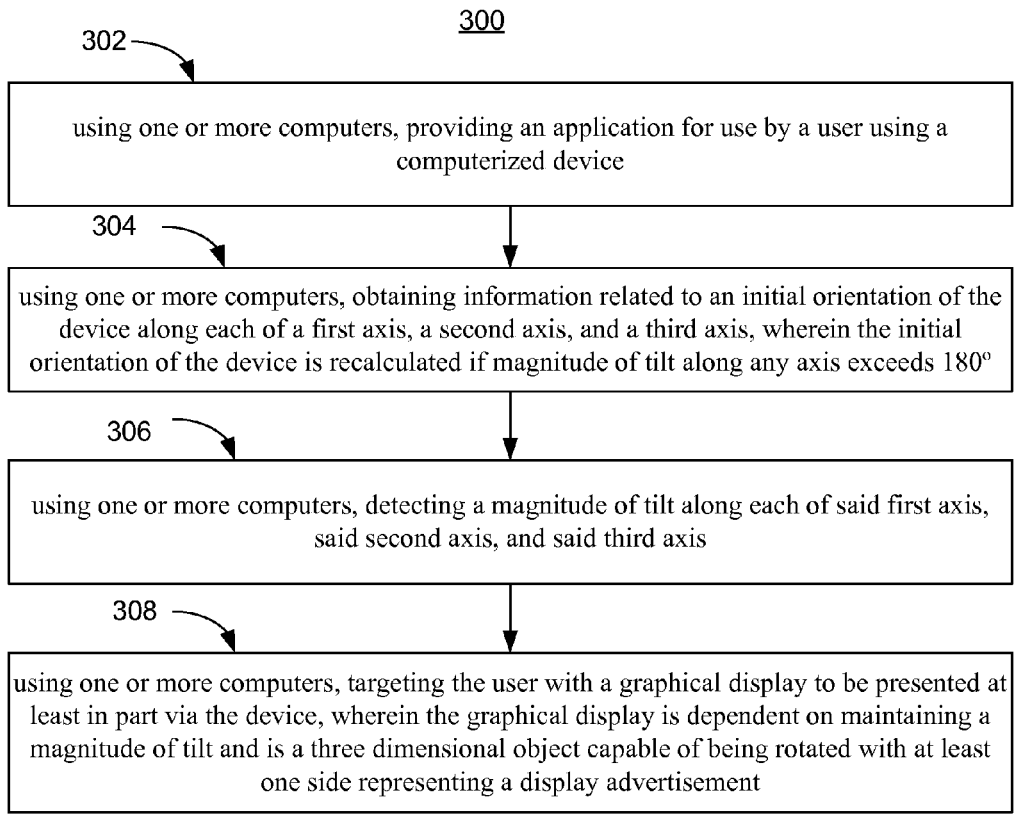
FIG. 3 is a flow diagram illustrating a method according to one embodiment of the invention.

FIG. 3 is a flow diagram illustrating a method 300 according to one embodiment of the invention. At step 302, using one or more server computers, an application for use by a user using a computerized device is provided. In some embodiments, a computerized device includes but is not limited to a mobile device, cell phone, tablet, PDA, or e-book reader. An application is typically installed by a user onto said computerized device on several platforms such as Apple iOS or Android operating systems.

At step 304, using one or more computers, information related to an initial orientation of the device along each of a first axis, a second axis, and a third axis is obtained, wherein the initial orientation of the device is recalculated if the magnitude of tilt along any axis exceeds 180°. This information serves as a measurement against any subsequent movements to detect any potential motion event triggered by a change in magnitude of tilt along any of the axes. The initial orientation is recalculated in the event the device experiences significant movement indicative of a user's intention of removing a device from idleness to be used, putting a device back into a storage compartment, dropping a phone, or handing a phone to another person. To illustrate by way of example, a user who has a smartphone and opens a mobile application on his/her smartphone while holding it in his/her hand at a certain initial orientation. Any subsequent movements of the smartphone by the user may trigger a motion event depending on the magnitude of tilt along the coordinate axes with respect to the initial orientation.

At step 306, using one or more computers, it is determined whether there exists a magnitude of tilt along each of said first axis, said second axis, and said third axis. This determination is made with respect to the initial orientation. At step 308, using one or more computers, the user is targeted with a graphical display to be presented at least in part via the device, wherein the graphical display is dependent on maintaining a magnitude of tilt and is a three dimensional object capable of being rotated with at least one side representing a display advertisement.

Figure 4:
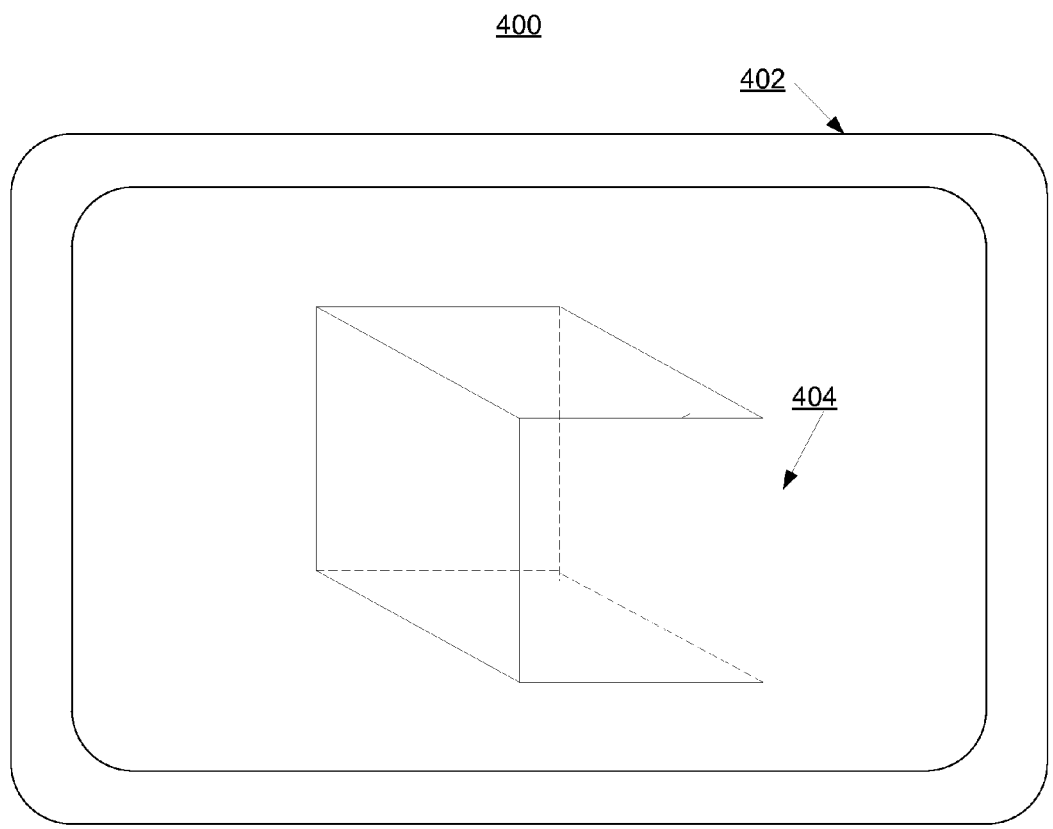
FIG. 4 is a block diagram illustrating one embodiment of the invention.

FIG. 4 is a block diagram 400 according to one embodiment of the invention. The computerized device 402 targets the user with a graphical display wherein the graphical display is a three-dimensional object 404 capable of being rotated with at least one side representing a display advertisement. In this figure, the three-dimensional object 404 is represented as a cube capable of being rotated with at least one of its six faces representing a display advertisement.

Figure 5:
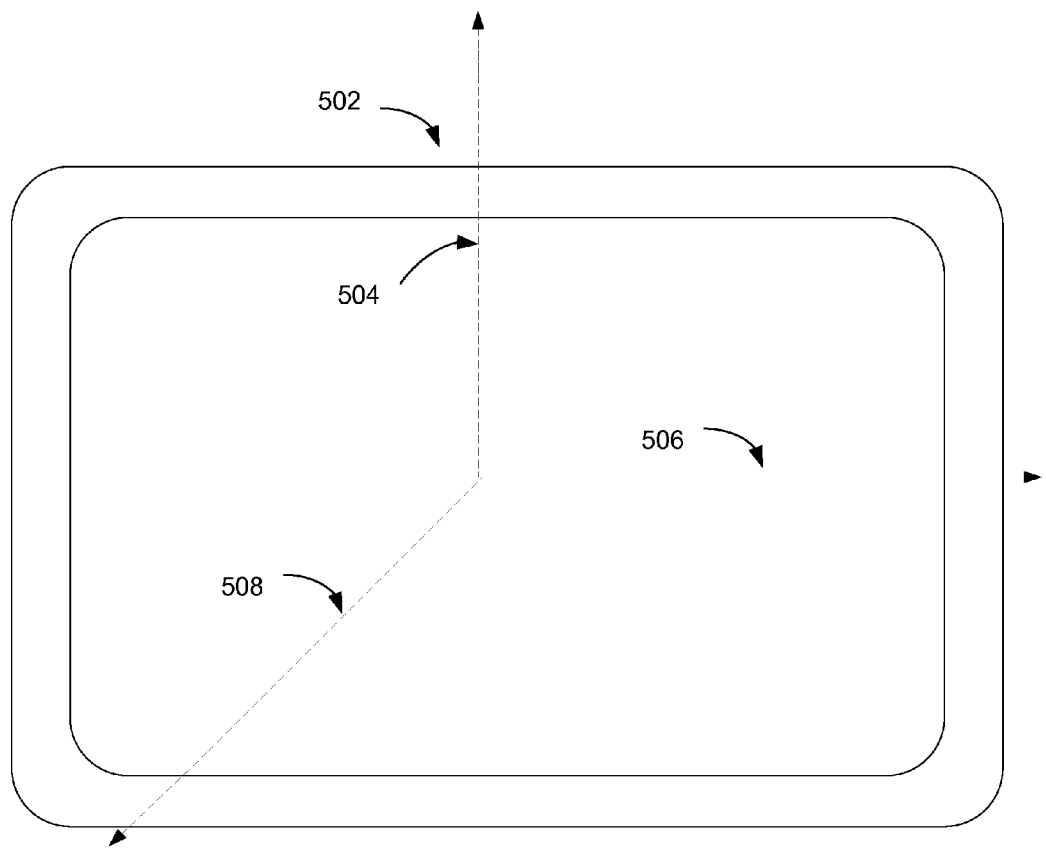
FIG. 5 is a block diagram illustrating one embodiment of the invention.

FIG. 5 is a block diagram 500 according to one embodiment of the invention. The computerized device 502 obtains information related to an initial orientation of the device along each of a first axis 504, a second axis 506, and a third axis 508. Motion events are detected based on a magnitude of tilt along each of said first axis 504, said second axis 506, and said third axis 508.

While the invention is described with reference to the above drawings, the drawings are intended to be illustrative, and the invention contemplates other embodiments within the spirit of the invention.

The invention claimed is:

1. A system comprising one or more processors and a non-transitory storage medium comprising program logic for execution by the one or more processors, the program logic comprising:

an orientation threshold programming module that:
based on obtained user device orientation information, detects a change in rotational orientation of the device beyond a specified threshold, wherein the detection of the change beyond the specified threshold comprises detection of a specified degree of change in orientation with respect to at least one rotational axis, from a detected previous orientation of the device, wherein an initial orientation of the device is recalculated if the detected degree of change exceeds a predefined maximum value; and a rotatable display object programming module that:
upon detection of the change in rotational orientation of the device beyond the specified threshold, causes display, on the device, of a visibly three-dimensional object having a set of faces, wherein each of the faces comprises an associated face display, and wherein the visibly three-dimensional object can be visibly rotated, by touch screen interaction of the user with the device, to select a face, of the set of faces, for display of a face display associated with the selected face, wherein for a first face, of the set of faces, the associated face display is reserved exclusively for displaying advertisements, and wherein each of the face displays, associated with each of the faces, encompasses an entire display screen of the device.

2. The system of claim 1, wherein the rotatable display object programming module, upon detection of a second change in rotational orientation of the device below the specified threshold, causes display of the visibly three-dimensional object to cease.

3. The system of claim 1, wherein the visibly three-dimensional object is a cube having six faces.

4. The system of claim 1, wherein the visibly three-dimensional object is associated with an application, and wherein each of the face displays, associated with each of the faces, comprises an aspect of the application, including, for the first face, of the set of faces, advertising related to the application.

5. The system of claim 1, wherein the visibly three-dimensional object is associated with an application, and wherein each of the face displays, associated with each of the faces, comprises an aspect of the application, including, for the first face, of the set of faces, advertising related to the application, and wherein at least some of the face displays present visible previews of screens that are part of the application.

6. The system of claim 1, wherein the visibly three-dimensional object is associated with an application, and wherein each of the face displays, associated with each of the faces, comprises an aspect of the application, including, for the first face, of the set of faces, advertising related to the application, and wherein at least some of the face displays present features of the application.

7. The system of claim 1, wherein, for a second face, of the set of faces, an associated second face display is a home screen, such that, from any other face display, associated with any other face of the set of faces, the user can touch navigate back to display the second face display.

8. The system of claim 1, wherein, for a second face, of the set of faces, an associated second face display is a home screen, such that, from any other face display, associated with any other face, the user can touch navigate back to display the second face display by touching a touchable visible button.

9. The system of claim 1, wherein, for a second face, of the set of faces, an associated second face display is a home screen, such that, from any other face display, associated with any other face, the user can touch navigate back to display the second face display by touching a touchable visible button, and wherein the second face display is visible upon initial display of the visibly three-dimensional object.

10. A method comprising:
based on obtained user device orientation information, detecting a change in rotational orientation of the device beyond a specified threshold, wherein the detection of the change beyond the specified threshold comprises detection of a specified degree of change in orientation with respect to at least one rotational axis, from a detected previous orientation of the device, wherein an initial orientation of the device is recalculated if the detected degree of change exceeds a predefined maximum value;
upon detection of the change beyond the specified threshold, causing display, on the device, of a visibly three-dimensional object having a set of faces, wherein each of the faces comprises an associated face display, and wherein the visibly three-dimensional object can be visibly rotated, by touch screen interaction of the user with the device, to select a face, of the set of faces, for display of the face display associated with the selected face, wherein for a first face, of the set of faces, the associated face display is reserved exclusively for displaying advertisements, and wherein each of the face displays, associated with each of the faces, encompasses an entire display screen of the device; and
upon detection of a second change in rotational orientation of the device below the specified threshold, causing display of the visibly three-dimensional object to cease.

11. The method of claim 10, comprising causing display of the visibly three-dimensional object, wherein the visibly three-dimensional object is a cube having six faces.

12. The method of claim 10, comprising causing display of the visibly three-dimensional object, wherein the visibly three-dimensional object is associated with an application, and wherein each of the face displays, associated with each of the faces, comprises an aspect of the application, including, for the first face of the set of faces, advertising related to the application.

13. A non-transitory computer readable storage medium or media tangibly storing computer program logic capable of being executed by a computer processor, the program logic comprising:
orientation threshold programming logic that:
based on obtained user device orientation information, detects a change in rotational orientation of the device beyond a specified threshold, wherein the detection of the change beyond the specified threshold comprises detection of a specified degree of change in orientation with respect to at least one rotational axis, from a detected previous orientation of the device, wherein an initial orientation of the device is recalculated if the detected degree of change exceeds a predefined maximum value; and
rotatable display object programming logic that:
upon detection of the change in rotational orientation of the device beyond the specified threshold, causes display, on the device, of a visibly three-dimensional object having a set of faces, wherein each of the faces comprises an associated face display, and wherein the visibly three-dimensional object can be visibly rotated, by touch screen interaction of the user with the device, to select a face, of the set of faces, for display of the face display associated with the selected face, wherein, for a first face, of the set of faces, the associated face is reserved exclusively for displaying advertisements, and wherein each of the face displays, associated with each of the faces, encompasses an entire display screen of the device.

14. The non-transitory computer readable storage medium or media of claim 13, comprising rotatable display object programming logic that, upon detection of a second change below the specified threshold, causes display of the visibly three-dimensional object to cease.

* * * * *